United States Patent
Baskakov et al.

(10) Patent No.: US 9,150,703 B2
(45) Date of Patent: Oct. 6, 2015

(54) METHOD OF STABILIZING SILOXANES HAVING TERMINAL HYDROXY GROUPS

(71) Applicant: Wacker Chemie AG, Munich (DE)

(72) Inventors: Agnes Baskakov, Hochburg (AT);
Gilbert Geisberger, Altoetting (DE);
Michaela Tanzer, Ueberackern (AT)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/334,854

(22) Filed: Jul. 18, 2014

(65) Prior Publication Data

US 2015/0025189 A1 Jan. 22, 2015

(30) Foreign Application Priority Data

Jul. 22, 2013 (DE) .................. 10 2013 214 312

(51) Int. Cl.
| | | |
|---|---|---|
| *C08J 3/00* | (2006.01) | |
| *C08K 3/28* | (2006.01) | |
| *C08J 11/00* | (2006.01) | |
| *C08G 77/16* | (2006.01) | |

(52) U.S. Cl.
CPC . *C08K 3/28* (2013.01); *C08G 77/16* (2013.01); *C08J 3/00* (2013.01); *C08J 11/00* (2013.01)

(58) Field of Classification Search
None
See application file for complete search history.

(56) References Cited

U.S. PATENT DOCUMENTS

| | | | |
|---|---|---|---|
| 5,420,221 A * | 5/1995 | Razzano et al. | ............... 528/16 |
| 5,569,688 A | 10/1996 | Meguriya et al. | |
| 6,359,667 B1 | 3/2002 | Koyanagi et al. | |
| 2005/0137362 A1 | 6/2005 | Ackermann | |
| 2007/0066783 A1 | 3/2007 | Woerner et al. | |
| 2014/0155644 A1 | 6/2014 | Popp et al. | |

FOREIGN PATENT DOCUMENTS

| | | |
|---|---|---|
| DE | 10 2005 045 336 A1 | 3/2007 |
| DE | 10 2011 079 751 A1 | 1/2013 |
| EP | 1 544 252 A1 | 6/2005 |
| JP | 11-228698 A | 8/1999 |

* cited by examiner

*Primary Examiner* — Marc Zimmer
(74) *Attorney, Agent, or Firm* — Brooks Kushman P.C.

(57) ABSTRACT

Siloxanes having terminal hydroxy groups, and which have a content of cyclic siloxanes of not more than 5% by weight, are stabilized by addition of ammonia in gaseous form or as a solution in a protic or aprotic solvent or in the form of an ammonia-releasing compound in amounts of at least 0.01 ppm by weight and not more than 100 ppm by weight, calculated as ammonia and based on the total weight of the siloxanes having terminal hydroxy groups. Ammonia in gaseous form is preferably used.

21 Claims, 1 Drawing Sheet

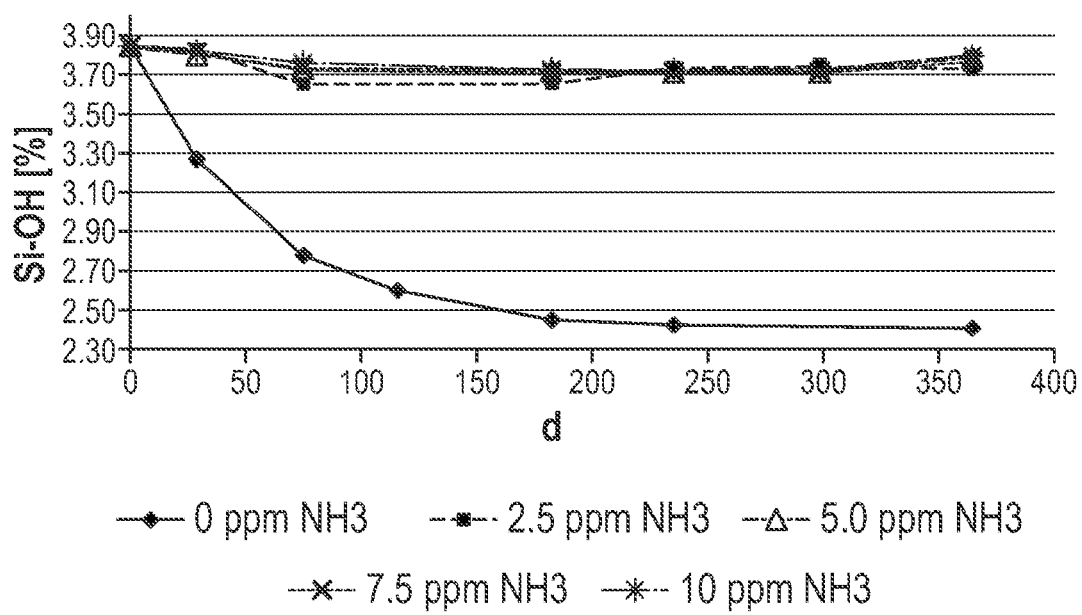

METHOD OF STABILIZING SILOXANES HAVING TERMINAL HYDROXY GROUPS

CROSS-REFERENCE TO RELATED APPLICATIONS

This application claims priority to German Patent Application No. 10 2013 214 312.5 filed Jul. 22, 2013 which is herein incorporated by reference.

BACKGROUND OF THE INVENTION

1. Field of the Invention

The invention relates to a method of stabilizing siloxanes.

2. Background Art

U.S. Pat. No. 5,569,688 describes the addition of ammonia or an ammonia-releasing compound to addition-crosslinking silicone compositions which contain platinum catalysts and siloxanes having alkenyl groups in order to reduce compression set without adversely affecting crosslinkability.

US 2007/0066783 A1 (DE 10 2005 045 336 A1) discloses the addition of ammonia or an ammonia-releasing compound to addition-crosslinking silicone compositions which contain pyrogenic, hydrophobic silica and SiH crosslinkers in order to improve storage stability; here, storage stability means a largely constant flowability and viscosity of the silicone compositions.

In US 2005/0137362 A1 (EP 1 544 252 A1), organic amines are added to resin-like organopolysiloxanes containing hydroxy groups and also residual amounts of Si-bonded chlorine atoms, in order to increase the storage stability, in particular to avoid viscosity increases through to gelling. The residual amounts of Si-bonded chlorine atoms are disadvantageous since they can lead, e.g. with silanol groups Si—OH, atmospheric moisture, or residual traces of water and alcohol, to generation of hydrogen chloride during storage, and this hydrogen chloride can act as condensation catalyst and lead to viscosity increases through to gelling of the resin-like organopolysiloxanes. The compounds containing amino groups contain 1, 2 or 3 organic radicals on the amino group and are used in large amounts, for example in amounts of 100 ppm by weight.

DE 10 2011 079 751 A1 describes the removal of cyclic siloxanes from short-chain siloxanes having terminal hydroxy groups with the aid of a stream of steam. However, the siloxanes obtained are not storage-stable over a prolonged period of time since the Si-bonded hydroxy groups Si—OH are unstable and form Si—O—Si siloxane bonds by self-condensation with elimination of water. This lack of stability results in the formation of water, clouding, ring formation, and lengthening of the chain, which are disadvantageous.

SUMMARY OF THE INVENTION

It was an object of the invention to provide a method in which the abovementioned disadvantages are avoided, in which the storage stability of siloxanes having terminal Si-bonded hydroxy groups is improved, and in which, in particular, the content of cyclic siloxanes is also low. These and other objects are achieved by the invention, wherein small amounts of ammonia, not exceeding 100 ppm, are added to silanol-stopped organopolysiloxanes.

BRIEF DESCRIPTION OF THE DRAWINGS

FIG. 1 shows the dependence of the Si—OH content [% by weight] on the time d [in days], which is a measure of the storage stability, at various ammonia concentrations [ppm by weight]. The Si—OH content was determined by means of FT-NIR spectroscopy at 25° C. (reference method: $^1$H-NMR).

DETAILED DESCRIPTION OF THE PREFERRED EMBODIMENT(S)

The invention thus provides a method of stabilizing siloxanes having terminal Si-bonded hydroxy groups, which have a content of cyclic siloxanes of not more than 5% by weight, based on the total weight of the siloxanes having terminal Si-bonded hydroxy groups, by addition of ammonia in gaseous form or as a solution in a protic or aprotic solvent or in the form of an ammonia-releasing compound in amounts of at least 0.01 ppm by weight, preferably at least 1 ppm by weight, more preferably at least 2.5 ppm by weight, and not more than 100 ppm by weight, preferably not more than 20 ppm by weight, more preferably not more than 10 ppm by weight, in each case calculated as ammonia and based on the total weight of the siloxanes having terminal hydroxy groups.

The siloxanes having terminal Si-bonded hydroxy groups preferably have a chain length of from 2 to 1000, more preferably from 2 to 150, Si atoms.

The cyclic siloxanes preferably have from 3 to 20, more preferably from 3 to 6, Si atoms.

The siloxanes having terminal Si-bonded hydroxy groups preferably have a content of cyclic siloxanes of not more than 2% by weight, based on the total weight of the siloxanes having terminal Si-bonded hydroxy groups.

Ammonia is preferably used in gaseous form. Ammonia in gaseous form is preferably used in amounts of from 1 to 20 ppm by weight, more preferably from 2.5 to 10 ppm by weight, based on the total weight of the siloxanes having terminal Si-bonded hydroxy groups.

An example of a protic solvent in which ammonia is present in dissolved form is water.

Examples of aprotic solvents in which ammonia is present in dissolved form are saturated and unsaturated hydrocarbons in linear and cyclic form, e.g. hexane, pentane, cyclohexane and petroleum ether; aromatic hydrocarbons such as xylene, toluene and benzene; halogenated aliphatic and aromatic hydrocarbons such as dichloromethane, trichloromethane, 1,2-dichloroethane and chlorobenzene; linear and cyclic ethers such as diethyl ether, tetrahydrofuran, methyl tert-butyl ether; ketones such as acetone and methyl ethyl ketone; and esters such as ethyl acetate.

The solvents can be used individually or in the form of mixtures of solvents.

Examples of ammonia-releasing compounds are urea, uric acid, ammonium salts, silazanes and also derivatives of a primary amide, for example carbamates, carbaminates, semicarbazides and semicarbazones, or organic or inorganic esters thereof.

The ammonia-releasing compounds can be used individually or in the form of mixtures of ammonia-releasing compounds.

If ammonia in gaseous form is used in the method of stabilizing siloxanes, the method can be carried out at a pressure of from 1000 to 10,000 hPa, preferably in the range from 1000 to 4000 hPa.

The method is preferably carried out at a temperature of from 10 to 100° C., more preferably from 20 to 50° C.

Ammonia in gaseous form or as a solution in a protic or aprotic solvent or in the form of an ammonia-releasing compound can be introduced into the system in any way and at a variety of places.

The method of stabilizing siloxanes having terminal Si-bonded hydroxy groups can be carried out batchwise, semicontinuously or fully continuously.

The siloxanes having terminal Si-bonded hydroxy groups which are used in the method of effecting stabilization, which have a content of cyclic siloxanes of not more than 5% by weight, preferably not more than 2% by weight, based on the total weight of the siloxanes having terminal Si-bonded hydroxy groups, are preferably obtained by a method in which, in order to remove cyclic siloxanes from a mixture containing cyclic siloxanes and siloxanes having terminal Si-bonded hydroxy groups, the cyclic siloxanes and a smaller proportion of very short-chain, volatile siloxanes are separated off by means of a stream of steam at a pressure of from 1 to 500 hPa, preferably from 10 to 100 hPa, more preferably from 20 to 30 hPa. The method for removing the cyclic siloxanes is preferably carried out at a temperature of from 50 to 200° C., more preferably from 140 to 180° C., and most preferably from 155 to 180° C.

Preference is therefore given to a method of stabilizing siloxanes in which i) in a first step, the cyclic siloxanes are separated off from a mixture containing cyclic siloxanes and siloxanes having terminal Si-bonded hydroxy groups by means of a stream of steam at a pressure of from 1 to 500 hPa, and ii) in a second step, ammonia in gaseous form or as a solution in a protic or aprotic solvent or in the form of an ammonia-releasing compound is added in amounts of at least 0.01 ppm by weight, preferably at least 1 ppm by weight, more preferably at least 2.5 ppm by weight, and not more than 100 ppm by weight, preferably not more than 20 ppm by weight, more preferably not more than 10 ppm by weight, in each case calculated as ammonia and based on the total weight of the siloxanes having terminal Si-bonded hydroxy groups, to the resulting siloxanes having terminal Si-bonded hydroxy groups having a content of cyclic siloxanes of not more than 5% by weight, preferably not more than 2% by weight, based on the total weight of the siloxanes having terminal Si-bonded hydroxy groups, in order to effect stabilization.

Preference is given to likewise removing a small proportion of very short-chain, volatile siloxanes in addition to the cyclic siloxanes in step i).

The cyclic siloxanes preferably have the general formula (I)

$$(R^1R^2SiO)_m \quad (I)$$

where $R^1$ is an alkyl radical having from 1 to 12 carbon atoms,
$R^2$ is an alkyl radical having from 1 to 12 carbon atoms or an aryl radical having from 5 to 30 carbon atoms or an alkenyl radical having from 2 to 12 carbon atoms and
m is an integer from 3 to 20, preferably from 3 to 6.

Examples of alkyl radicals $R^1$ are the methyl, ethyl, propyl, tert-butyl and hexyl radicals, with preference being given to the methyl radical.

Examples of radicals $R^2$ are alkyl radicals such as the methyl, ethyl, propyl, tert-butyl and hexyl radicals; aryl radicals such as the phenyl, tolyl, xylyl and naphthyl radicals; and alkenyl radicals such as the vinyl radical. Preference is given to each radical $R^2$ being selected independently from among methyl and vinyl radicals. Particular preference is given to $R^2$ being selected from among methyl and vinyl radicals and each radical $R^2$ being the same, so that all radicals $R^2$ are either methyl or vinyl radicals.

The proportion of the cyclic siloxanes having from 3 to 6 Si atoms, preferably cyclic siloxanes of the formula (I) where m is from 3 to 6, in the siloxanes having terminal Si-bonded hydroxy groups is, after application of the method of removing the cyclic siloxanes, preferably less than 50,000 ppm by weight, more preferably less than 20,000 ppm by weight, and most preferably less than 10,000 ppm by weight, in each case based on the total weight of the siloxanes having terminal Si-bonded hydroxy groups.

The siloxanes having terminal Si-bonded hydroxy groups preferably have the general formula (II)

$$HO(R^3R^4SiO)_nH \quad (II)$$

where $R^3$ is an alkyl group having from 1 to 12 carbon atoms, $R^4$ is an alkyl group having from 1 to 12 carbon atoms or an aryl group having from 5 to 30 carbon atoms or an alkenyl group having from 2 to 12 carbon atoms and n is an integer from 2 to 1000, preferably from 2 to 150.

Examples of $R^3$ and preferred meanings of $R^3$ have been indicated above for $R^1$. Examples of $R^4$ and preferred meanings of $R^4$ have been indicated above for $R^2$.

The formula (II) can contain T units, i.e. units of the formula $R^*SiO_{3/2}$, where $R^*$ is a radical $R^3$ or $R^4$, where $R^3$ and $R^4$ have the meanings indicated above, and Q units, i.e. units of the formula $SiO_2$, in addition to the D units, i.e. units of the formula $R^3R^4SiO$, with the T and Q units being present in amounts of from 0 to 10% by weight, preferably from 0 to 5% by weight, in each case based on the total weight of the siloxanes having terminal Si-bonded hydroxy groups.

The siloxanes having terminal Si-bonded hydroxy groups can be obtained by hydrolysis of chlorosilanes. For example, siloxanes of the formula (II) can be obtained by hydrolysis of dimethyldichlorosilane or methylvinyldichlorosilane or mixtures thereof. The resulting product is separated from the aqueous phase and preferably purified by means of distillation. The product of the hydrolysis is a mixture of cyclic siloxanes and siloxanes having terminal Si-bonded hydroxy groups.

Since cyclic siloxanes, for example hexamethylcyclotrisiloxane D3, octamethylcyclotetrasiloxane D4, decamethylcyclopentasiloxane D5 and dodecamethylcyclohexasiloxane D6, are formed in the hydrolysis, it is advantageous to reduce the content thereof.

Particular preference is therefore given to a method of stabilizing siloxanes in which i) in a first step, in order to remove cyclic siloxanes from a mixture containing cyclic siloxanes and siloxanes having terminal Si-bonded hydroxy groups, the cyclic siloxanes are separated off by means of a stream of steam at a pressure of from 1 to 500 hPa, preferably from 10 to 100 hPa, and a temperature of from 140 to 180° C., preferably from 155 to 180° C., giving siloxanes having terminal Si-bonded hydroxy groups in which the proportion of cyclic siloxanes having from 3 to 6 Si atoms is less than 50,000 ppm by weight, preferably less than 20,000 ppm by weight, more preferably less than 10,000 ppm by weight, in each case based on the total weight of the siloxanes having terminal Si-bonded hydroxy groups, and ii) in a second step, ammonia in gaseous form or as a solution in a protic or aprotic solvent or in the form of an ammonia-releasing compound is added in amounts of at least 0.01 ppm by weight, preferably at least 1 ppm by weight, more preferably at least 2.5 ppm by weight, and not more than 100 ppm by weight, preferably not more than 20 ppm by weight, more preferably not more than 10 ppm by weight, in each case calculated as ammonia and based on the total weight of the siloxanes having terminal Si-bonded hydroxy groups, to the siloxanes having terminal Si-bonded hydroxy groups obtained in the first step, in order to effect stabilization.

The removal of the cyclic siloxanes is preferably carried out with the aid of a stream of steam, e.g. by steam distillation, for example by a method as is described in DE 10 2011 079 751 A1. The method is, in contrast to DE 10 2011 079 751 A1, preferably carried out under reduced pressure, i.e. at from 1 to 500 hPa, preferably from 10 to 100 hPa, more preferably from 20 to 30 hPa, and preferably at elevated temperatures, i.e. at from 50 to 200° C., preferably from 140 to 180° C., more preferably from 155 to 180° C.

The method for removing the cyclic siloxanes can be carried out batchwise, semicontinuously or fully continuously.

The mixture of steam and cyclic siloxanes which have been separated off is condensed by methods known to those skilled in the art, for example by condensation in a condenser. The cyclic siloxanes which are less soluble in water at temperatures lower than the method temperature are then preferably separated off from the condensed steam by physical separation operations, e.g. phase separation. The cyclic siloxanes and the small proportion of very short-chain, volatile siloxanes can then preferably be reused in the method for preparing the siloxanes.

Example 1

The crude product from a hydrolysis process, consisting of a mixture of cyclic siloxanes of the formula (I) where $R^1=R^2=CH_3$ and linear siloxanes having terminal Si-bonded hydroxy groups of the formula (II) where $R^3=R^4=CH_3$, with an Si—OH content of 2.36% by weight and a composition which can be found in Table 1, is, in the first step, purified by distillation at 160° C. and 20 hPa at a throughput of 600 kg/h by means of a stream of steam of 0.9 m³/h in order to remove cyclic siloxanes. The distillate is recirculated to the process for preparing the siloxanes.

The resulting product has an Si—OH content of 3.6% by weight and a composition which can be found in Table 2. In a second step, gaseous ammonia is introduced at an admission pressure of from 3000 to 4000 hPa at 20° C. and a flow rate of about 4 l/h from a pressure vessel into this starting mixture which has a temperature of 50° C. and is transported at a continuous flow rate of 350 kg/h and a pressure of from 1013 to 1200 hPa. The stabilized product has an ammonia content of 20 ppm by weight and is dispensed into drums. The ammonia content is determined by means of titration, by dissolving the sample in toluene/isopropanol, using tetrabromophenolphthalein ethyl ester 0.2% strength in chloroform as the indicator, and titrating with a standard solution of 0.01 mol/l ethanolic HCl.

TABLE 1

| Composition of the hydrolysate before distillation | | | | |
|---|---|---|---|---|
| Hexamethylcyclotrisiloxane [% by weight] | Octamethylcyclotetrasiloxane [% by weight] | Decamethylcyclopentasiloxane [% by weight] | Dodecamethylcyclohexasiloxane [% by weight] | Polysiloxane of the formula II having $R^1 = R^2 = CH_3$ and an average chain length of n = 12.7 [% by weight] |
| 1.62% | 27.3% | 2.15% | 1.18% | 67.5% |

Determination by Means of $^1$H-NMR and $^{29}$Si-NMR

TABLE 2

| Composition after distillation | | | | |
|---|---|---|---|---|
| Hexamethylcyclotrisiloxane [ppm by weight] | Octamethylcyclotetrasiloxane [ppm by weight] | Decamethylcyclopentasiloxane [ppm by weight] | Dodecamethylcyclohexasiloxane [ppm by weight] | Polysiloxane of the formula II having $R^1 = R^2 = CH_3$ and an average chain length of n = 18.6 [% by weight] |
| <80 ppm | <60 ppm | 1540 ppm | 3740 ppm | 99.5% |

Regarding Table 2:

Method of determining the content of cyclic siloxanes: gas chromatography (as per the method of: CES—Centre Européen des Silicones, Title: Quantification of residual amounts of Volatile Siloxanes in silicone products, Issue date: Apr. 16, 2013).

Method of determining the average chain length: based on DIN 55672-1: Gel permeation chromatography (GPC). Part 1: Tetrahydrofuran (THF) as eluent (however, toluene is employed instead of THF as eluent in this example) or ISO 16014-1:2012(E), Plastics—Determination of average molecular mass and molecular mass distribution of polymers using size-exclusion chromatography—Part 1: General principles, and ISO 16014-3:2012(E), Plastics—Determination of average molecular mass and molecular mass distribution of polymers using size-exclusion chromatography—Part 3: Low-temperature method.

Additional Information on the Method:
Columns: Agilent PLGel 10 000 Å+500 Å+100 Å (column material and pore size distribution and also molar mass measurement range −600,000–10,000/30,000–500/−4000), each 300×7.5 mm, 5 μm (length×diameter, particle diameter of the stationary phase).
Eluent: toluene
Flow: 1.0 ml/min
Column temperature: 45° C.
Detector: RI
Calibration: Polystyrene standards, 3rd order
Internal standard: flow marker
Injection volume: 100 μl
Sample conc.: 3 mg/ml dissolved in toluene.

Example 2

A product prepared in a manner analogous to Example 1 and having an Si—OH content of 3.85% by weight and an ammonia content of 18.3 ppm by weight is diluted with ammonia-free (0 ppm by weight) material having the composition shown in Table 2 to ammonia contents in the range from 2.5 to 10 ppm by weight. The product is subsequently stored for a number of months at room temperature and subjected at regular intervals to analysis in order to quantitatively determine the Si—OH content. The results are presented in FIG. 1.

It can be seen that without ammonia stabilization (0 ppm by weight of NH$_3$), the Si—OH content drops very quickly and is decreased by 25% after only 2 months. This is due to the decrease in reactivity of the end groups, the elimination of water and the increase in the siloxane chain length. Even ammonia concentrations of about 2.5 ppm by weight and above give an appreciable increase in stability. The material has 97% of the initial Si—OH content even after 8 months and is also stable over 12 months.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of stabilizing siloxanes having terminal hydroxy groups and having a content of cyclic siloxanes of not more than 5% by weight, based on the total weight of the siloxanes having terminal hydroxy groups, comprising adding ammonia in gaseous form or as a solution in a protic or aprotic solvent or in the form of an ammonia-releasing compound, to provide an ammonia content in the siloxanes of at least 0.01 ppm by weight and not more than 100 ppm by weight, calculated as ammonia and based on the total weight of the siloxanes having terminal Si-bonded hydroxy groups.

2. The method of claim 1, wherein the amount of ammonia or ammonia-releasing compound, calculated as ammonia, is from 1 ppm to 20 ppm.

3. The method of claim 1, wherein the amount of ammonia or ammonia-releasing compound, calculated as ammonia, is from 2.5 ppm to 10 ppm.

4. The method of claim 1, wherein ammonia is used in gaseous form.

5. The method of claim 4, wherein ammonia is used in amounts of at least 2.5 ppm by weight.

6. The method of claim 4, which is carried out at a pressure of from 1000 to 10,000 hPa, and a temperature of from 10 to 100° C.

7. The method of claim 4, which is carried out at a pressure of from 1000 to 4,000 hPa, and a temperature of from 20 to 50° C.

8. A method of stabilizing siloxanes of claim 1, comprising:
   i) in a first step, removing cyclic siloxanes from a mixture containing cyclic siloxanes and siloxanes having terminal hydroxy groups by separating cyclic siloxanes by means of a stream of steam at a pressure of from 1 to 500 hPa to form a cyclic siloxane-depleted siloxane composition, and
   ii) in a second step, adding ammonia in gaseous form or as a solution in a protic or aprotic solvent or in the form of an ammonia-releasing compound, in an amount of at least 0.01 ppm by weight and not more than 100 ppm by weight, calculated as ammonia and based on the total weight of the siloxanes having terminal hydroxy groups, to the siloxanes composition resulting from step i), to effect stabilization.

9. A method of stabilizing siloxanes of claim 1, comprising:
   i) in a first step, removing cyclic siloxanes from a mixture containing cyclic siloxanes and siloxanes having terminal hydroxy groups by separating cyclic siloxanes by means of a stream of steam at a pressure of from 1 to 500 hPa to form a cyclic siloxane-depleted siloxane composition, and
   ii) in a second step, adding ammonia in gaseous form or as a solution in a protic or aprotic solvent or in the form of an ammonia-releasing compound, in an amount of at least 100 ppm by weight and not more than 20 ppm by weight, calculated as ammonia and based on the total weight of the siloxanes having terminal hydroxy groups, to the siloxane composition resulting from step i) to effect stabilization.

10. A method of stabilizing siloxanes of claim 1, comprising:
   i) in a first step, removing cyclic siloxanes from a mixture containing cyclic siloxanes and siloxanes having terminal hydroxy groups by separating cyclic siloxanes by means of a stream of steam at a pressure of from 1 to 500 hPa to form a cyclic siloxane-depleted siloxane composition, and
   ii) in a second step, adding ammonia in gaseous form or as a solution in a protic or aprotic solvent or in the form of an ammonia-releasing compound, in an amount of at least 2.5 ppm by weight and not more than 10 ppm by weight, calculated as ammonia and based on the total weight of the siloxanes having terminal hydroxy groups, to the siloxane composition resulting from step i), to effect stabilization.

11. The method of claim 1, wherein the cyclic siloxanes have the formula (I)

$$(R^1R^2SiO)_m \quad (I)$$

where
$R^1$ is an alkyl group having from 1 to 12 carbon atoms,
$R^2$ is an alkyl group having from 1 to 12 carbon atoms or an aryl group having from 5 to 30 carbon atoms or an alkenyl group having from 2 to 12 carbon atoms and
m is an integer from 3 to 20.

12. The method of claim 1, wherein the cyclic siloxanes have the formula (I)

$$(R^1R^2SiO)_m \quad (I)$$

where
$R^1$ is an alkyl group having from 1 to 12 carbon atoms,
$R^2$ is an alkyl group having from 1 to 12 carbon atoms or an aryl group having from 5 to 30 carbon atoms or an alkenyl group having from 2 to 12 carbon atoms and
m is an integer from 3 to 6.

13. The method of claim 1, wherein the siloxanes having terminal hydroxy groups have the formula (II)

$$HO(R^3R^4SiO)_nH \quad (II)$$

where
$R^3$ is an alkyl group having from 1 to 12 carbon atoms,
$R^4$ is an alkyl group having from 1 to 12 carbon atoms or an aryl group having from 5 to 30 carbon atoms or an alkenyl group having from 2 to 12 carbon atoms and
n is an integer from 2 to 1000.

14. The method of claim 8, wherein the pressure in step i) is from 10 to 100 hPa.

15. The method of claim 8, wherein the temperature in step i) is from 50 to 200° C.

16. A method of stabilizing siloxanes of claim 1, comprising:
i) in a first step, removing cyclic siloxanes from a mixture containing cyclic siloxanes and siloxanes having terminal Si-bonded hydroxy groups comprising separating cyclic siloxanes by means of a stream of steam at a pressure of from 1 to 500 hPa and a temperature of from 140 to 180° C., providing siloxanes having terminal Si-bonded hydroxy groups in which the proportion of cyclic siloxanes having from 3 to 6 Si atoms is less than 50,000 ppm by weight, based on the total weight of the siloxanes having terminal Si-bonded hydroxy groups, and
ii) in a second step, adding ammonia in gaseous form or as a solution in a protic or aprotic solvent or in the form of an ammonia-releasing compound in amounts of at least 0.01 ppm by weight and not more than 100 ppm by weight, calculated as ammonia and based on the total weight of the siloxanes having terminal Si-bonded hydroxy groups, to the siloxanes having terminal Si-bonded hydroxy groups obtained in the first step, to effect stabilization.

17. The method of claim 1, wherein the method is carried out batchwise.

18. The method of claim 1, wherein the method is carried out continuously.

19. The method of claim 8, wherein cyclic siloxanes separated in step i) are recycled to a process for preparing siloxanes having terminal Si-bonded hydroxy groups.

20. The method of claim 16, wherein cyclic siloxanes separated in step i) are recycled to a process for preparing siloxanes having terminal Si-bonded hydroxy groups.

21. The method of claim 13, wherein the siloxanes having terminal hydroxyl groups are hydroxyl-terminated polydimethylsiloxanes where n is from 2 to 150.

* * * * *